United States Patent [19]
Santangelo et al.

[11] Patent Number: 6,036,424
[45] Date of Patent: Mar. 14, 2000

[54] CART FOR UNLOADING AND TRANSPORTING CHAIN

[75] Inventors: Scott J. Santangelo, Freetown, Mass.; Trung D. Nguyen, East Greenwich; John H Klose, Exeter, both of R.I.

[73] Assignee: Toray Plastics (America), Inc., North Kingstown, R.I.

[21] Appl. No.: 09/133,510

[22] Filed: Aug. 12, 1998

[51] Int. Cl.[7] ........................................... B65F 67/02
[52] U.S. Cl. .................. 414/152; 414/172; 414/331.06; 414/331.08; 414/401
[58] Field of Search ................ 414/331.08, 331.07, 414/400, 401, 395, 396, 152, 150, 172, 209, 187

[56] References Cited

U.S. PATENT DOCUMENTS

| | | | |
|---|---|---|---|
| 1,205,690 | 11/1916 | Wetcke | 414/152 |
| 2,633,810 | 4/1953 | Freeman | 104/121 |
| 2,690,136 | 9/1954 | Freeman | 104/121 |
| 4,634,333 | 1/1987 | Butterly, Jr. | 414/331.08 X |
| 4,821,887 | 4/1989 | Iemura et al. | 211/1.5 |
| 4,998,857 | 3/1991 | Paravella et al. | 414/331 |
| 5,127,788 | 7/1992 | Schulz | 414/331.06 |

*Primary Examiner*—Steven A. Bratlie
*Attorney, Agent, or Firm*—Barlow, Josephs & Holmes, Ltd.

[57] ABSTRACT

A cart for unloading and transporting chain is provided. The cart includes a frame with a number of tracks of a predetermined configuration which are superimposed over one another. Long segments of chain are routed from an oven onto a transfer rail assembly which, in turn, routes the segment of chain to a given track mounted in the cart. Subsequent segments are similarly routed to other tracks in the cart after the cart is elevated to register the empty track to be loaded with the corresponding transfer rail. As a result, the unloading and transporting chain for rebuild and repair is significantly simplified while reducing the overall time and burden associated therewith.

18 Claims, 18 Drawing Sheets

CART FOR UNLOADING AND TRANSPORTING CHAIN

BACKGROUND OF THE INVENTION

The present invention relates generally to chain for plastics ovens. More specifically, the present invention relates to a cart for unloading and transporting chain for plastic ovens.

In the plastics industry, it has been well-known to employ extremely large ovens to form plastic into sheets for use in a wide array of applications, such as food packaging, and the like. These plastic ovens heat the plastic and form it into wide sheets where two continuous loops of chain, positioned on opposing sides of the running sheet of plastic, effectively stretch the plastic sheet to a desired thickness for later spooling, curing, etc.

The two closed loops of chain are commonly made of individual links of chain known as "Tenter" chain which is known in the art and available from the Dornier Company in Germany. To accomplish the task of moving and stretching the continuous sheet of running plastic, each link must be extremely strong and rugged. It is not uncommon for each Tenter chain link to weigh 14 pounds each. A single closed loop chain segment on a given side of a plastics oven commonly includes 260 eight-link segments totaling 2,080 links having a gross weight of over 29,000 pounds. Periodically, as expected, this chain must be unloaded from the oven for service and repair.

In the prior art, it is common for a side door of the plastics oven to be opened to expose the Tenter chain. The loop is then broken and an eight-link segment is pulled therefrom and severed from the remaining loop of chain still remaining in the oven. This eight-link segment is manually removed from the oven and stacked onto a pallet. As can be understood, this eight-link segment weighs approximately 112 pounds and can be handled by a service technician. The remaining 259 eight-link segments are also stacked onto pallets and then sent to the repair/rebuild shop. The manually stacking of segments onto a pallet is extremely labor intensive. Not only is the job of palletizing eight-link segments a lengthy operation, it is also extremely physically demanding.

Since the individual Tenter chain links are such a critical component of a plastics oven and are extremely expensive, they are frequently unloaded and serviced to ensure that they are performing optimally. Typically, when a given loop of chain is unloaded and brought in for service, a second loop is immediately installed to avoid downtime of the oven. Essentially, it is common for at least two complete sets of Tenter chain, per side, to be used and rotated throughout the operation life of the oven. As a result, it can be understood that the aforementioned problems associated with unloading Tenter chain also apply to transporting the chain back to the oven after service and re-loading the chain into the oven. Overall, the current process of unloading, transporting and reloading Tenter chain is extremely burdensome and inefficient.

No attempts have been made in the prior art to streamline the chain transport problem discussed above. Larger than eight-link segments may be broken off and palletized to save some time, but in general, the entire process remains burdensome and inefficient. Due to the demand for a system for unloading, transporting and re-loading Tenter chain, it is desirable for a Tenter chain transport system to be efficient and not physically demanding. Further, it is also desirable for such a chain transport system to require much less time than prior art systems to unload and transport large numbers of Tenter chain links. Further, it is desirable that such a chain transport system require fewer people to unload and transport the chain link segments.

SUMMARY OF THE INVENTION

The present invention preserves the advantages of prior art carts for transporting items. In addition, it provides new advantages not found in currently available carts, and overcome many disadvantages of such currently available carts.

The invention is generally directed to a novel and unique chain unloading and transport cart with particular application in transporting Tenter chain to a maintenance shop for repair and rebuild. The improved chain unloading cart of the present invention enables the simple, easy and quick installation of a chain unloading and transport cart to a plastics oven for carrying out the unloading of an entire length of Tenter chain.

The preferred embodiment of the present invention includes a frame with a number of wheels connected to the frame where the wheels facilitate movement of the frame. A number of tracks are connected to the frame where each of the tracks are superimposed over and in spaced-apart relationship to one another. Each of the tracks have a loading end and a given length. Also, a transfer rail, with an entry end and an exit end, is provided where the entry end of the transfer rail is positioned proximal to a chain exit port of a plastics oven. The exit end of the transfer rail is positioned proximal to the loading ends of the tracks. A hydraulic lift is connected to the frame for moving the entire frame, which in turn, moves a given loading end of one of the tracks so that it is in close proximity to the exit end of the transfer rail. A number of rail transfer supports provide support for the transfer rail for carrying a segment of chain from the oven to one of the tracks which has its loading end proximal to the exit end of the transfer rail. Further, a track transport support is provided on each of the tracks for carrying a segment of chain during movement of the frame. In addition, each of the tracks have a substantially oval or race track configuration. A pull hook is connected to the frame to facilitate movement of the frame to the repair/rebuild facility.

In operation, the cart for unloading and transporting chain of the present invention, is rolled on its wheels proximal to the output of the oven from which the chain will be received. A hydraulic table is rolled underneath the cart and centered thereunder. A door of the oven is opened to expose the closed loop of Tenter chain therein. The chain is broken and the hydraulic table is elevated to its uppermost position so that the lowermost track on the cart is even with transfer rails which receive the segment of first segment of chain. This first segment of chain includes 94 links and fills up the entire lowermost oval-configured track. The chain is broken and the hydraulic table is lowered one level to receive the second segment, and so on. Once the cart is filled with four segments, another cart is moved into position and filled. As can be understood, as many carts, of the present invention, may be employed to accommodate as many links as needed. For re-loading chain into the oven, the process is carried out in reverse.

It is therefore an object of present invention to provide a cart for unloading, transporting, and re-loading chain from a plastics oven.

Another object of present invention is to provide a cart for transporting Tenter chain which is easy to install.

It is a further object of the present invention to provide a cart for transporting Tenter chain which can easily accommodate large numbers of Tenter chain links without the need for any physical lifting of the links or segments thereof.

It is a further object of the present invention to provide a cart for transporting Tenter chain which greatly reduces the overall time to unload and transport Tenter chain from a plastics oven.

It is an object of the present invention to provide a cart for transporting Tenter chain which greatly reduces the burden of the repair and rebuild process for Tenter chain links.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
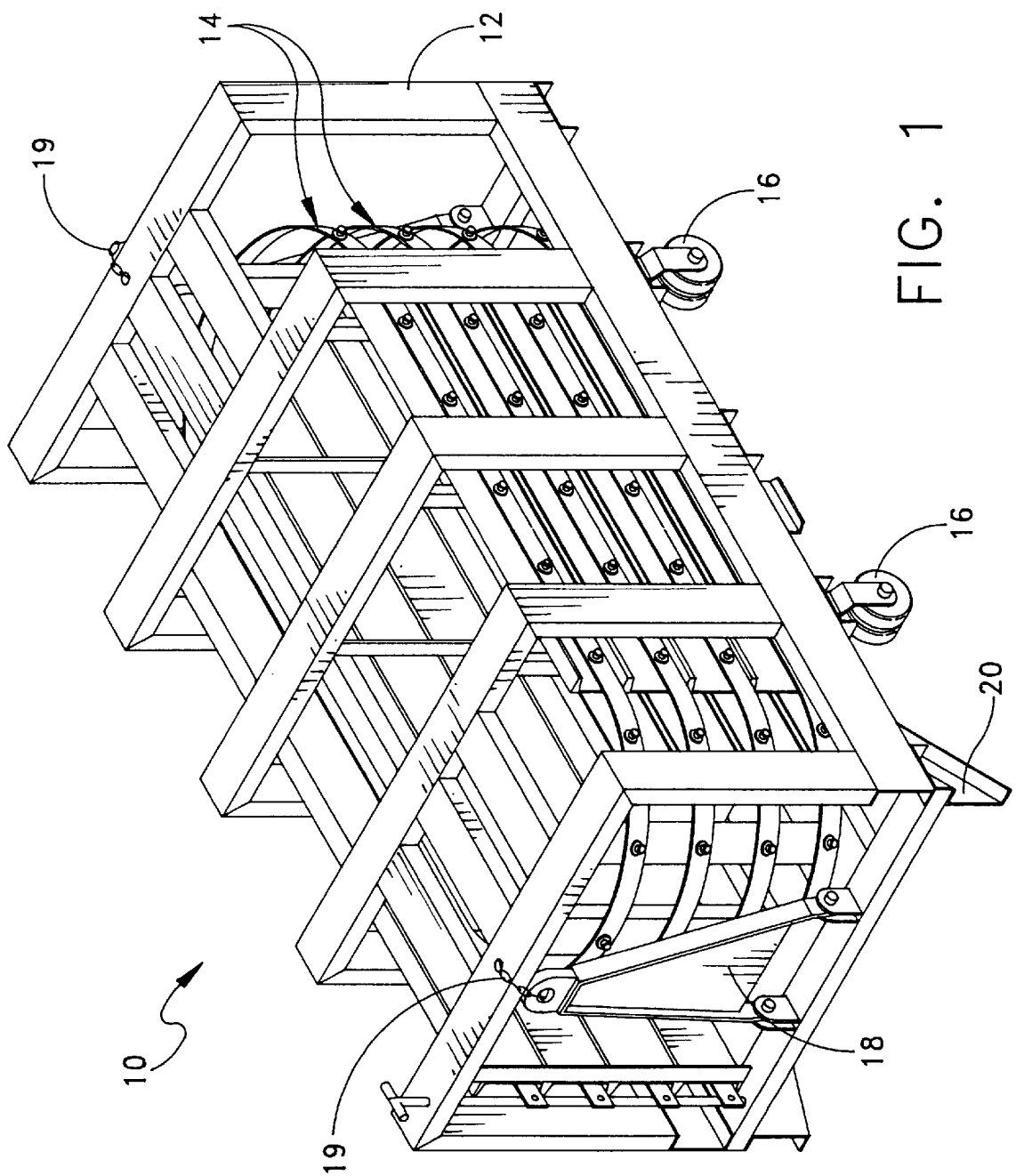
FIG. 1 is a perspective view of the chain unloading, transport and re-load cart of the present invention.
Figure 2:
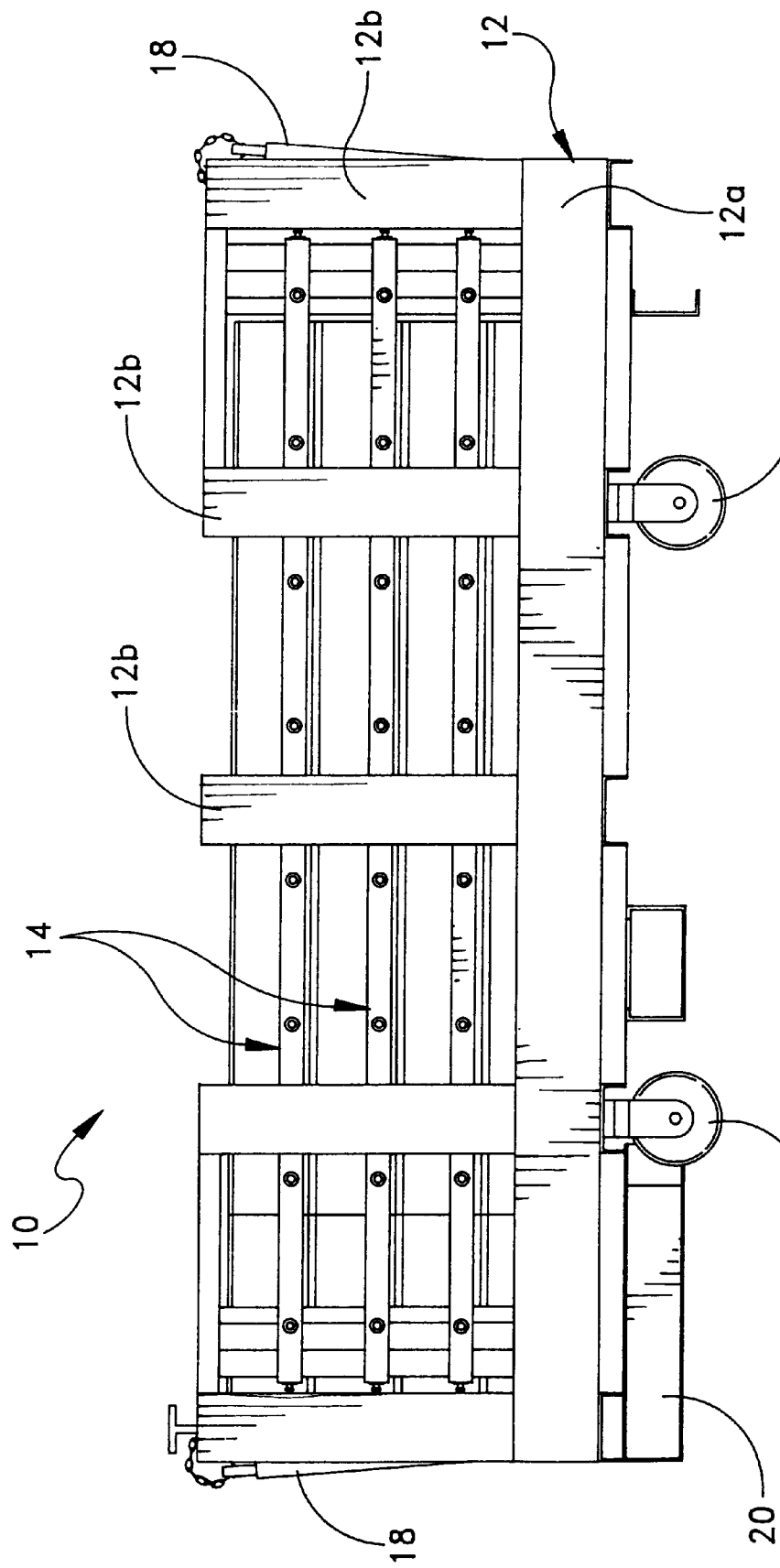
FIG. 2 is a side view of the cart of FIG. 1.

Referring first to FIGS. 1–4, the cart for unloading, transporting, and re-loading chain of the present invention is shown generally as 10. The cart 10 includes a frame 12 with a number of component members such as a number of horizontal members 12a, vertical members 12b and cross-members 12c. Frame 12 is, essentially, of a box-like configuration for ease of construction, durability, efficiency. It should be understood, however, that frame 12 may be modified significantly and still remain within the scope of this invention.

Frame 12 houses and supports a number of tracks 14 therein. As will be discussed in detail below, tracks 14 are preferably mounted to vertical members 12b to facilitate construction. As can be best seen in FIGS. 1 and 2, a number of tracks are provided in the same configuration as one another and, directly superimposed over one another to conserve space and facilitate the loading of the cart. The preferred embodiment of the invention includes four tracks in a given cart; however, more or less tracks may be provided per cart in accordance with the given application at hand. As will be discussed below, the use of four tracks per cart is optimal due to the loaded weight of the cart and the maneuverability thereof. It is envisioned that multiple carts be employed to accommodate portions of a given length of Tenter chain to be transported.

Still referring to FIGS. 1–4, a set of wheels 16 are provided to facilitate movement of cart 10. Further, pull hooks 18 may be unlocked from lock chain 19 to swivel downwardly to permit them to be engaged to a trailer hitch on a vehicle, for example. Hooks 18 are provided on both ends of the cart for further convenience.

Figure 3:
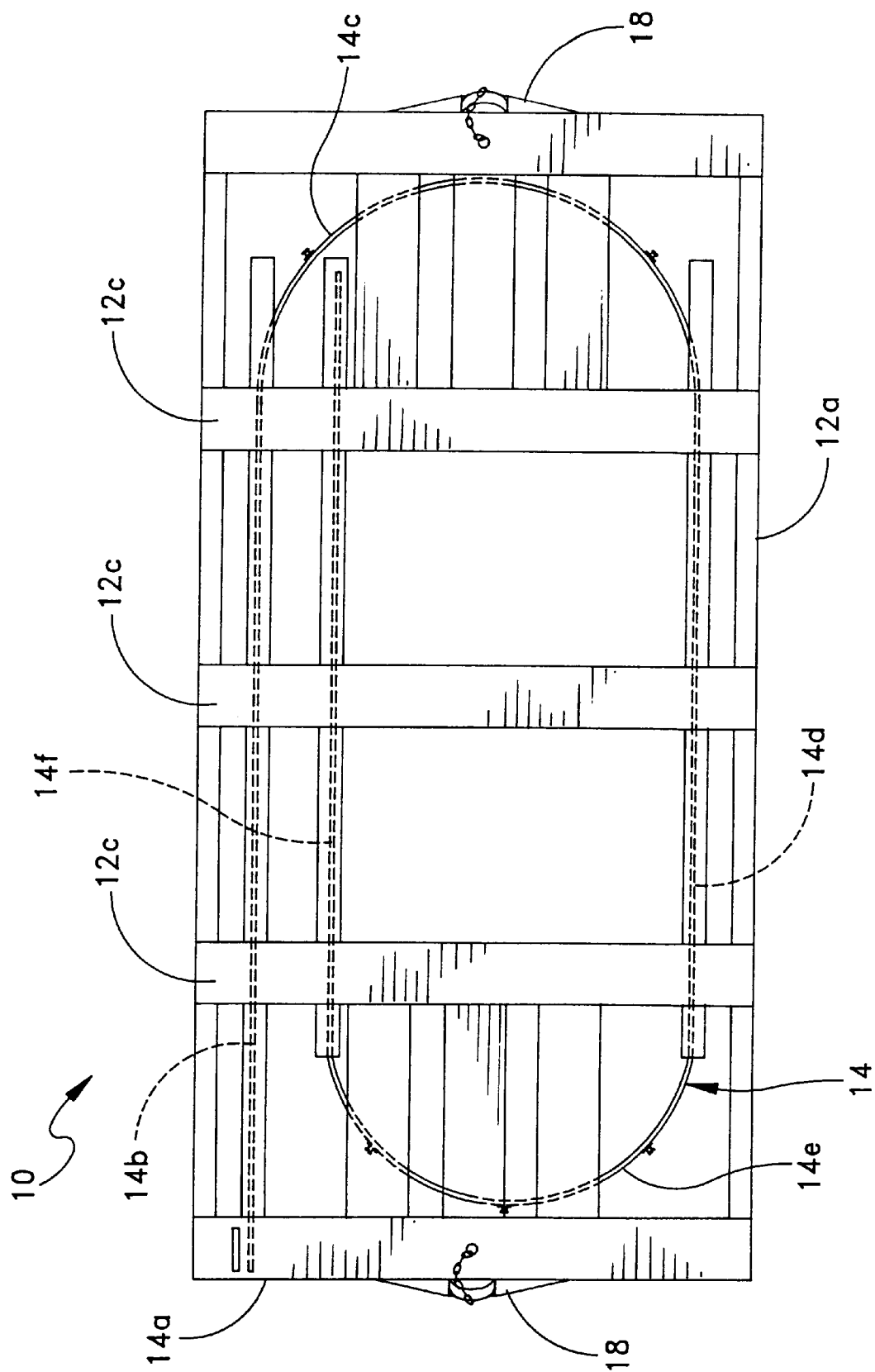
FIG. 3 is a top view of the cart of the present invention shown in FIG. 1.

Referring now, specifically, to FIG. 3, a top view of the cart 10, of the present invention, is shown to include the general track layout of track 14. Specifically, each track 14 preferably includes a loading end 14a, a first straight section 14b, a first curved section 14c, a second straight section 14d, a second curved section 14e, and a third straight section 14f. As a result, track 14 preferably has an oval or race track configuration whereby the first straight section 14b and third straight section 14f overlap. The present invention is optimized for oven chain, particularly Tenter chain. This Tenter chain, when residing and moving on a track, has a limited turn radius thereby limiting somewhat the feasible track configurations that can be utilized in accordance with this invention. FIG. 3 illustrates two curved sections 14e and 14c of track 14 which are configured to be within the physically permissible tuning radius of Tenter chain. This particular oval or race track configuration is an optimal configuration to maximize the use of space within cart 10. However, it should be understood that straight-line tracks, circular tracks, etc. are also considered to be within the scope of the present invention.

Figure 4:
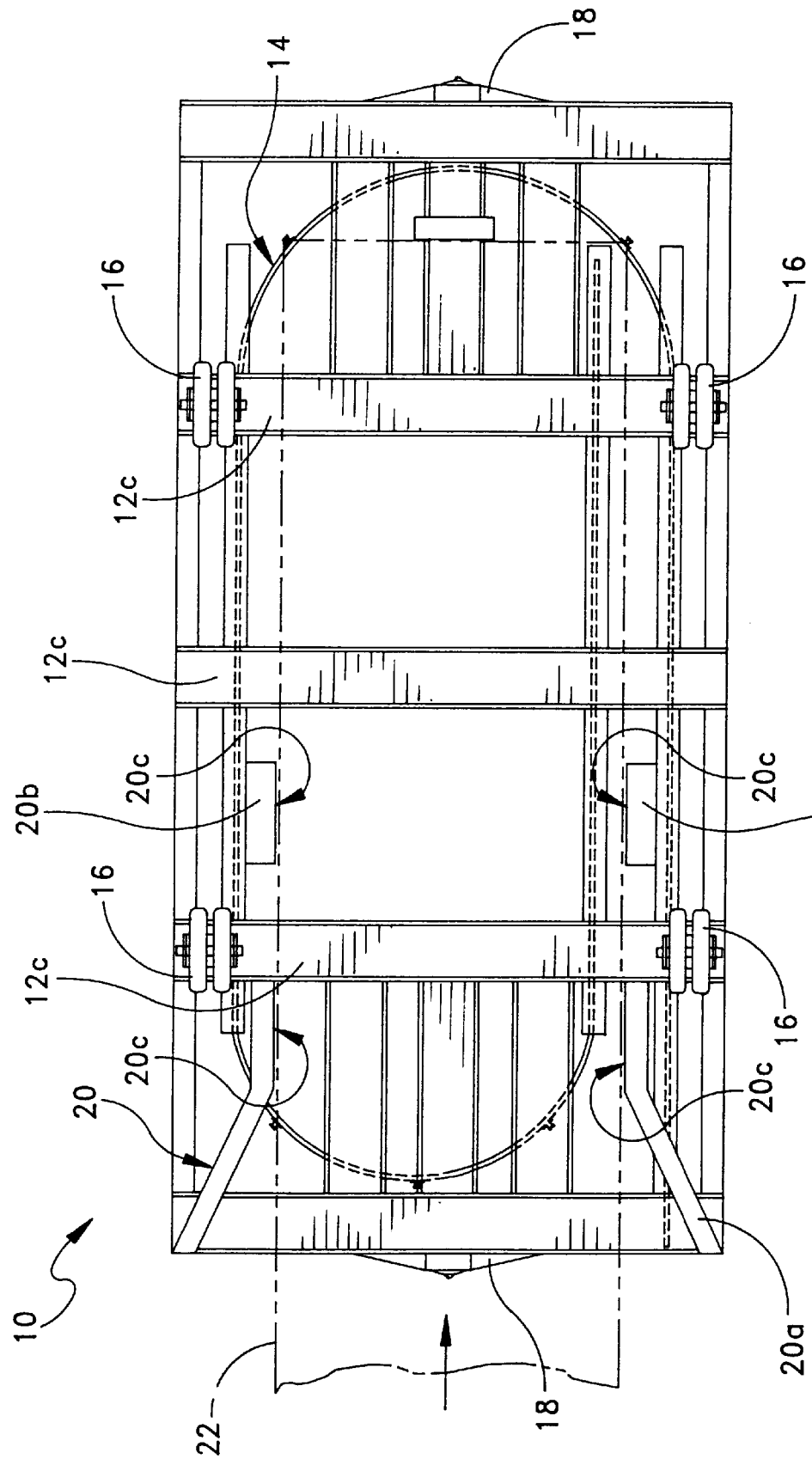
FIG. 4 is a bottom view of the cart of the present invention shown in FIG. 1.

Referring now to FIG. 4, a bottom view of the cart 10, of the present invention, is shown to include a centering guide 20 for centering a hydraulic lift table 22 under the cart 10 of the present invention. Angled portions 20a guide the hydraulic lift table 22 precisely underneath the center of cart 10. Channel members 20b of the centering guide 20 also provide an inner channel wall 20c to further guide hydraulic lift table 22 underneath cart 10.

Figure 5:
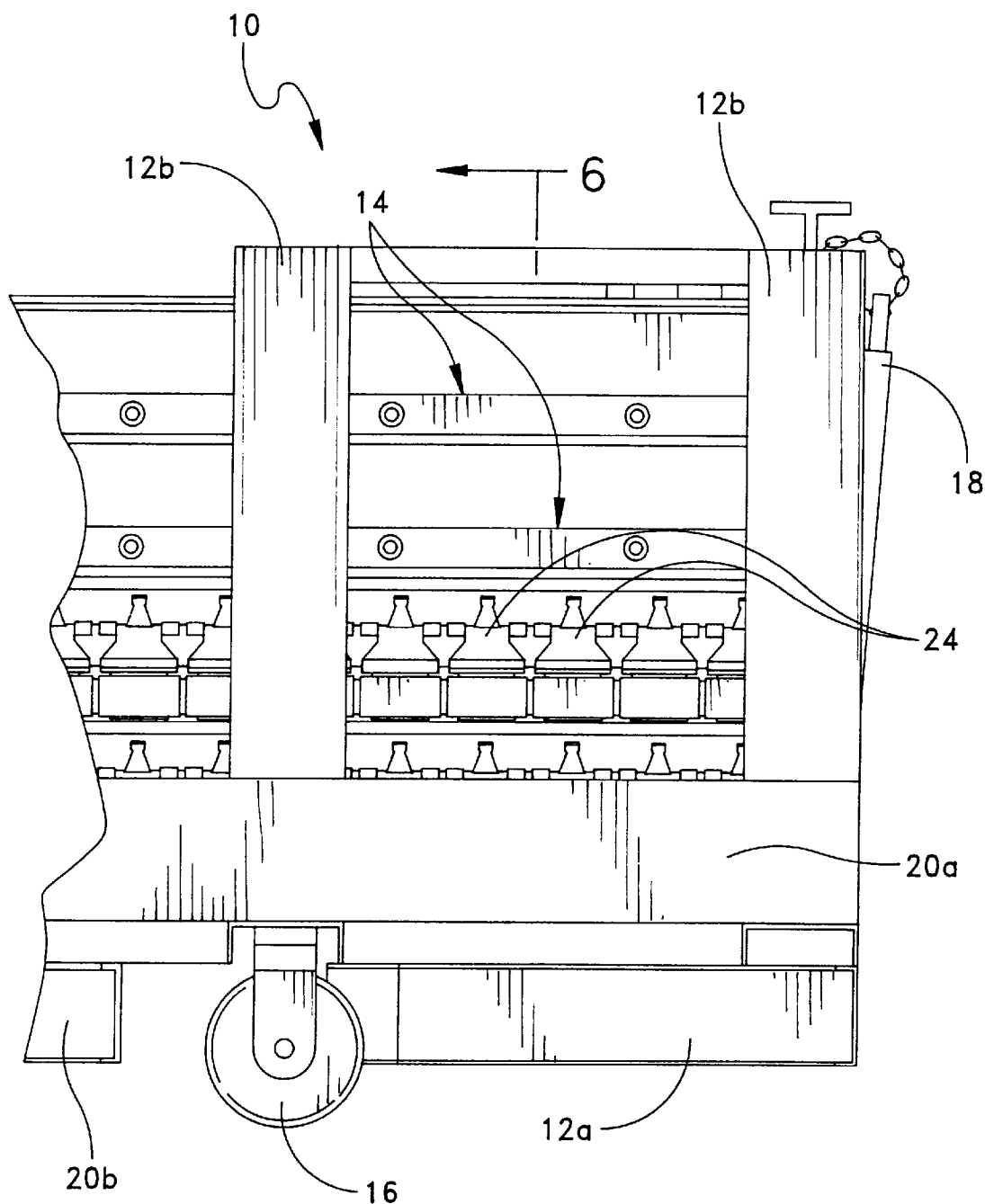
FIG. 5 is a partial side view of the cart of the present invention shown in FIG. 1 with the lowermost two tracks being filled with links.
Figure 6:
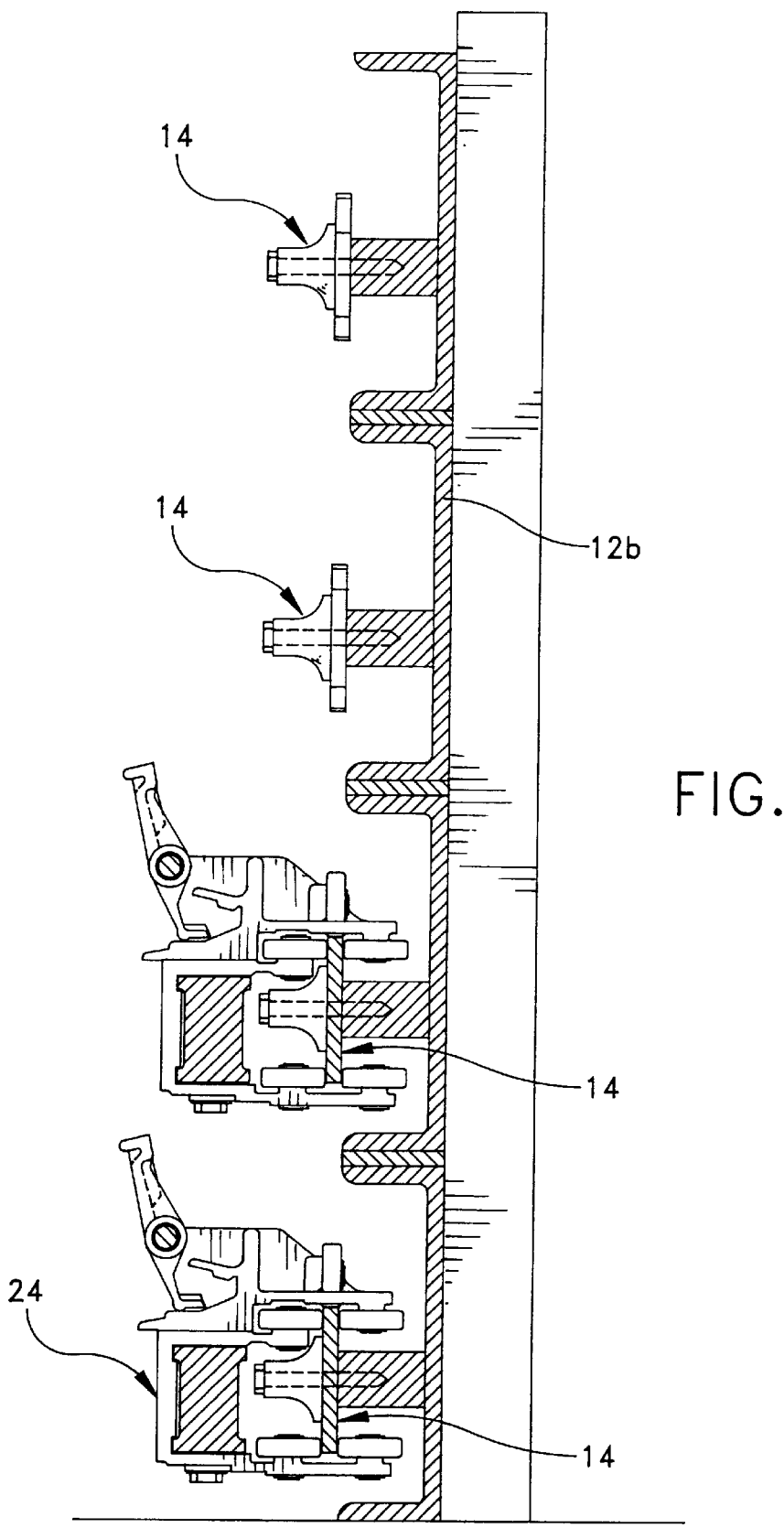
FIG. 6 is a cross-sectional view through the line 6—6 of FIG. 5.
Figure 7:
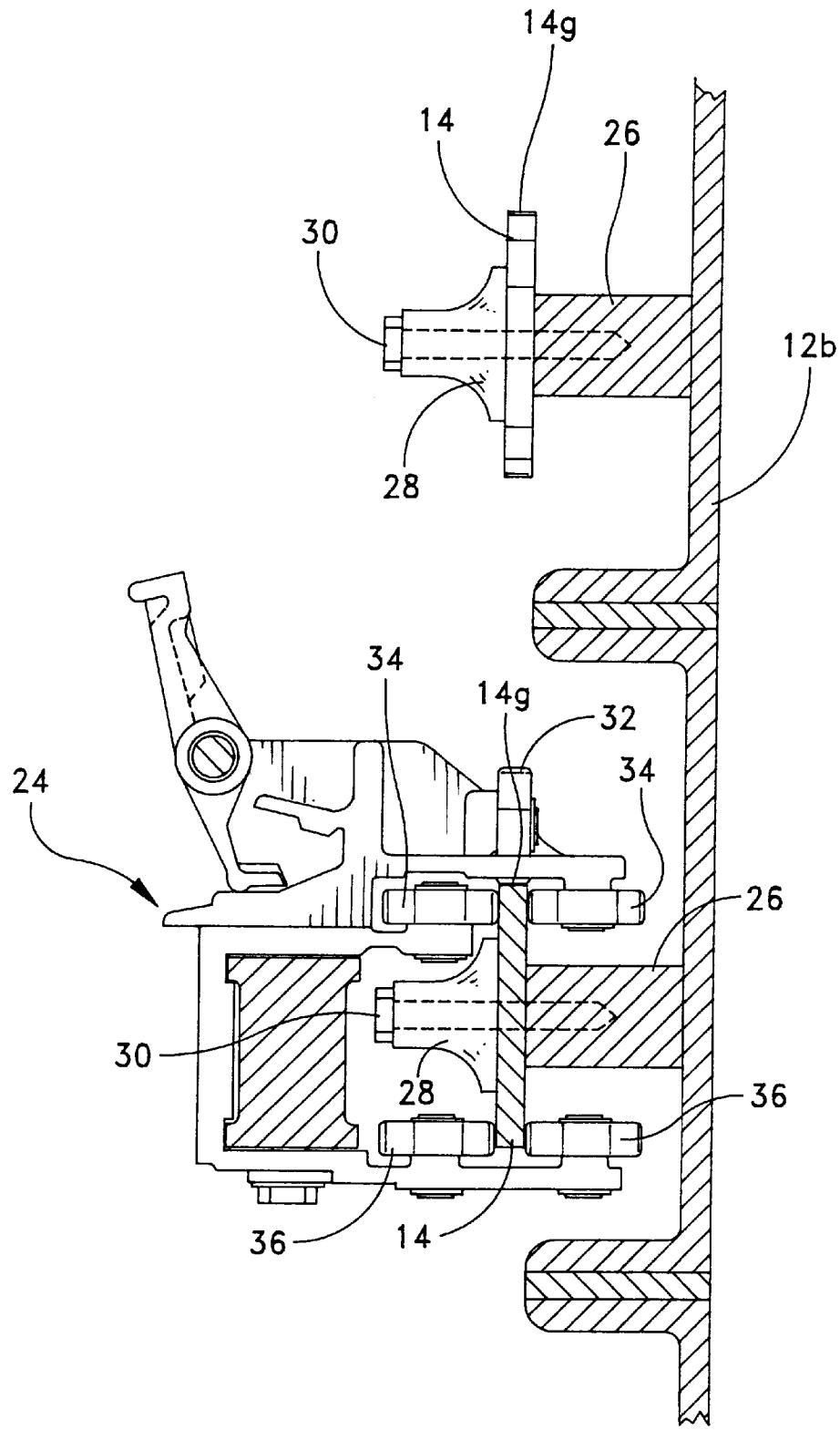
FIG. 7 is a close-up view of the cross-sectional view of FIG. 6 focusing on an individual link.

Referring now to FIGS. 5–7, the internal track configuration is shown. FIG. 5 illustrates a cart 10 with a set of four tracks 14 superimposed over one another in an oval race track configuration. FIG. 5 shows the two upper tracks being free of Tenter chain links loaded thereon while the lowermost two tracks 14 house and support a segment of Tenter chain links 24. FIG. 6 illustrates a cross-sectional view through the line 6—6 of FIG. 5 where the lowermost tracks 14 support a segment of Tenter chain links 24. FIG. 7 illustrates a close-up view of FIG. 6 focusing on the interconnection between a Tenter chain link 24 and a track 14. In particular, the frame 12 provides a vertical member 12b which has a horizontal support post 26 connected thereto. A track 14 is fastened to each horizontal support post 26 by a fastener 30 via a collar 28. A given Tenter chain link includes vertical roller wheels 32, upper horizontal roller wheels 34 and lower horizontal roller wheels 36 for engaging and communicating with different portions of track 14. In particular, vertical roller wheels 32 engage with the upper surface 14g of track 14. As a result of the interconnection between Tenter chain link 24 and track 14, long segments of Tenter chain links can be easily routed, with little effort, onto a given track 14.

Figure 8:
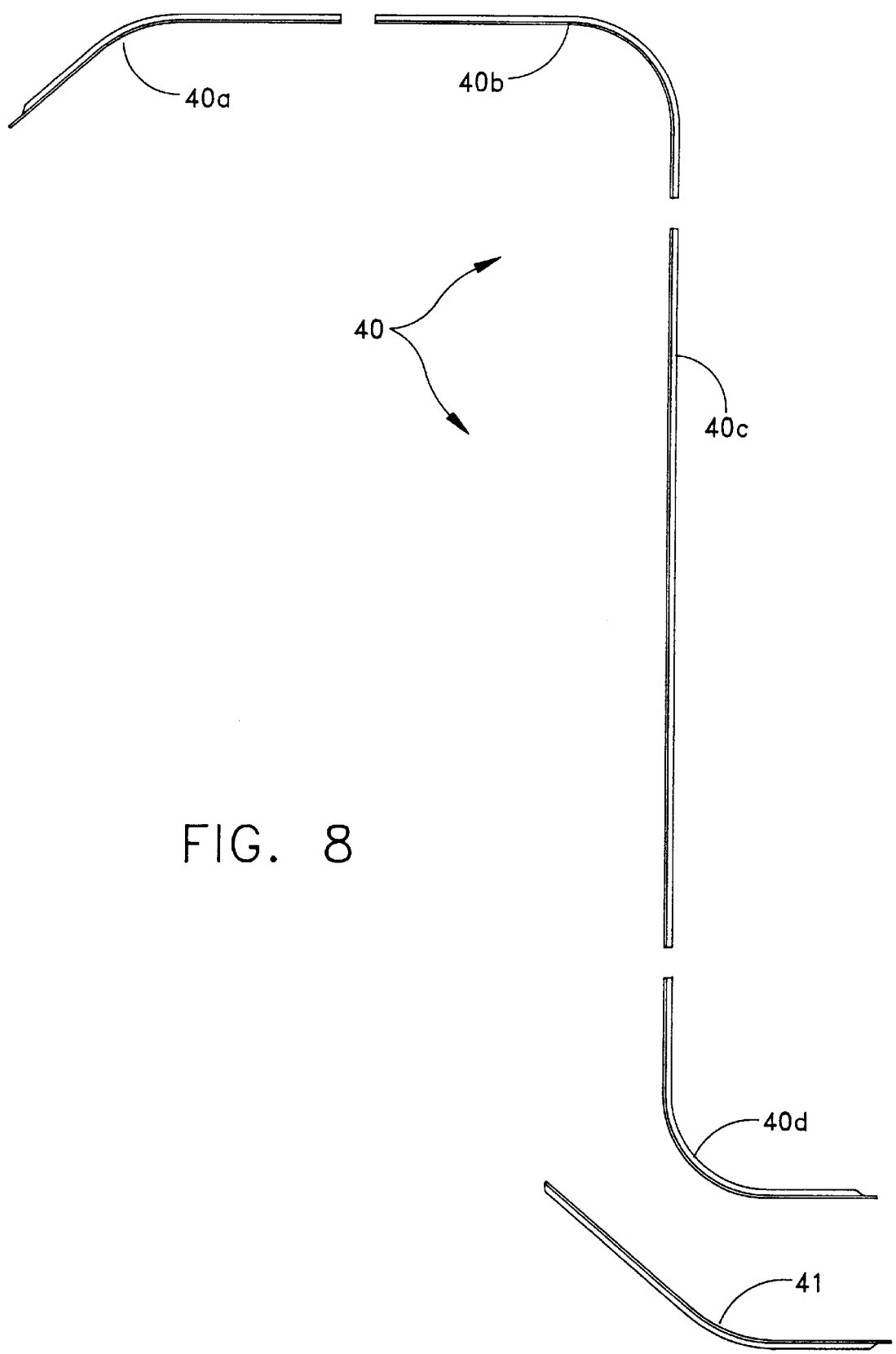
FIG. 8 is a general, broken plan view of the transfer rails layout.

Turning now to FIGS. 8–14, details of the transfer rail system is shown. First, FIG. 8 illustrates the general plan layout of the transfer rail assemblies 40 and 41 in accordance with the present invention. Right side transfer rail assembly 40 includes a first section 40a, a second section 40b, a third section 40c, and a fourth section 40d. Left side transfer rail assembly 41 includes only one section. The layout and configuration of the transfer rail assemblies 40 and 41 are preferred but other configurations, using more or less sections and in different configurations, may be employed and still be within the scope of the invention. In addition, cart 10, in accordance with the present invention, is preferably at least 150 inches long by at least 65 inches wide and at least 30 inches high to accommodate a set of 4 tracks superimposed over one another. The cart 10 may be dimensioned in accordance with the particular application at hand, namely the number of tracks needed and the number of links to be accommodated per track 14. It is preferred that the frame 12, tracks 14, transfer rail assemblies 40 and 41 be made of steel for durability and strength.

Figure 9:
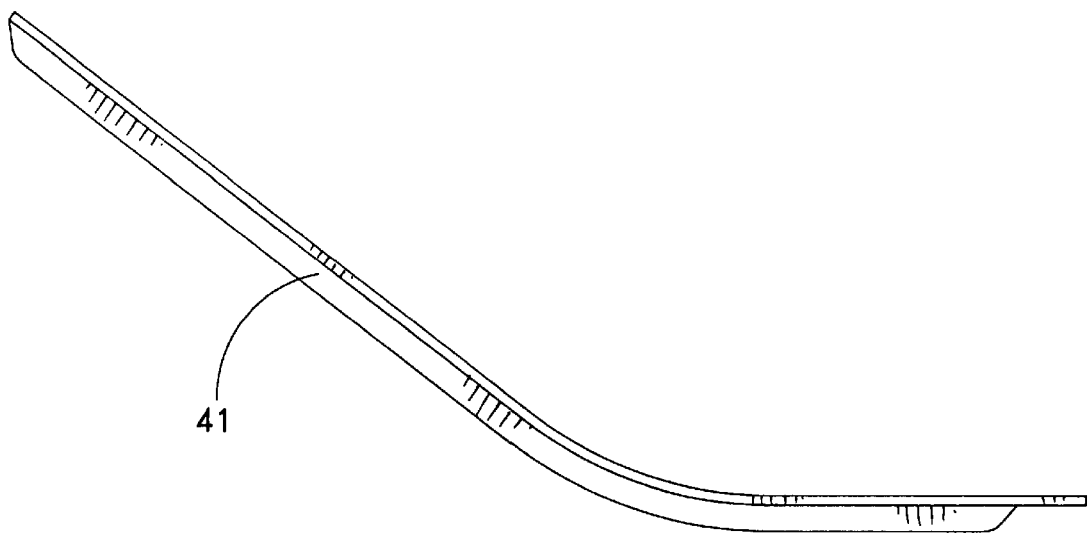
FIG. 9 is a top view of the left side transfer rail section.
Figure 10:
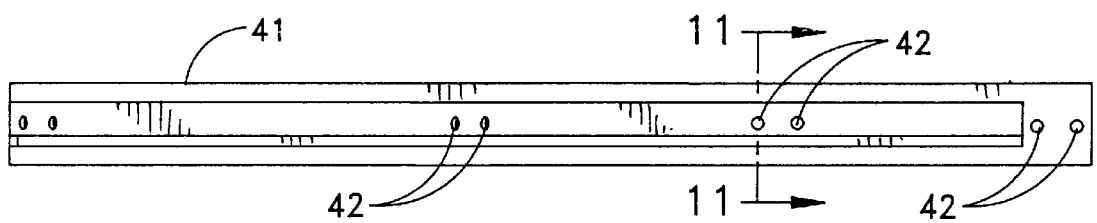
FIG. 10 is a front view of the left side transfer rail section of FIG. 9.
Figure 11:
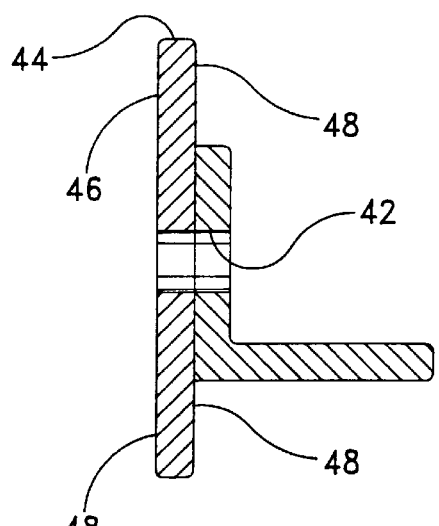
FIG. 11 is a cross-sectional view through the line 11—11 of FIG. 10.

FIG. 9 illustrates an example of one of the transfer rail segments found in assemblies 40 and 41. For illustration purposes only, the left side transfer rail assembly 41 is shown to illustrate the details of a transfer rail assembly. The general structure of the sections of right side transfer rail assembly 40 is, essentially, identical to the left side section 41 but sized and configured differently with varying curves and straight runs. FIG. 10 illustrates a front view of the left side section 41 shown in FIG. 9. Referring to both FIGS. 10 and 11, which is a cross-sectional view through line 11—11, apertures 42 are provided to receive fasteners therethrough while top edge 44 receives vertical roller wheels 32 of the Tenter chain 24 and top side surfaces 46 receive and communicate with upper horizontal roller wheels 34 of links 24 and bottom side surfaces 48 receive and communicate with the lower horizontal roller wheels 36 of the Tenter chain links 24.

Figure 12:
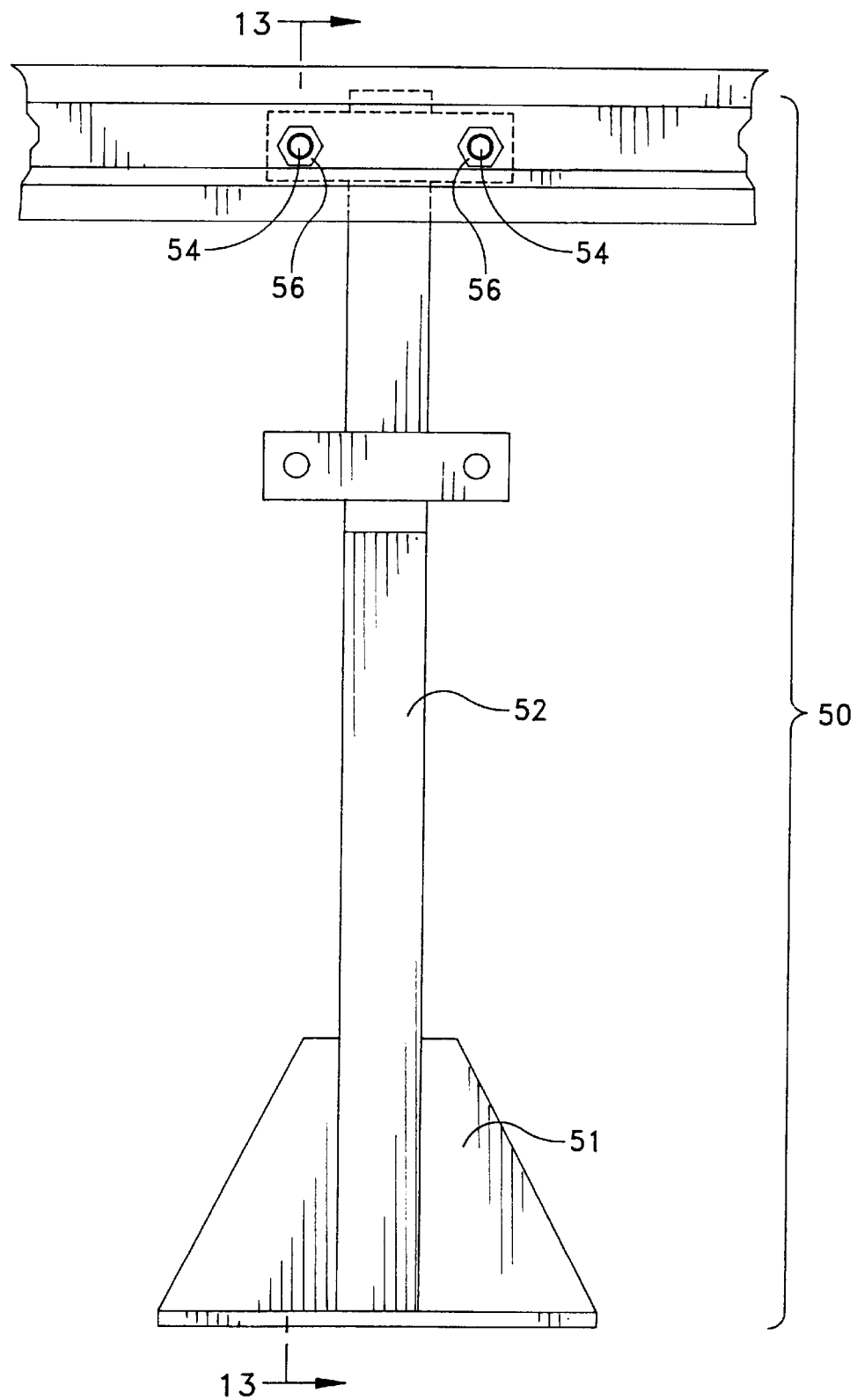
FIG. 12 is a front view of a transfer rail support in accordance with the present invention.
Figure 13:
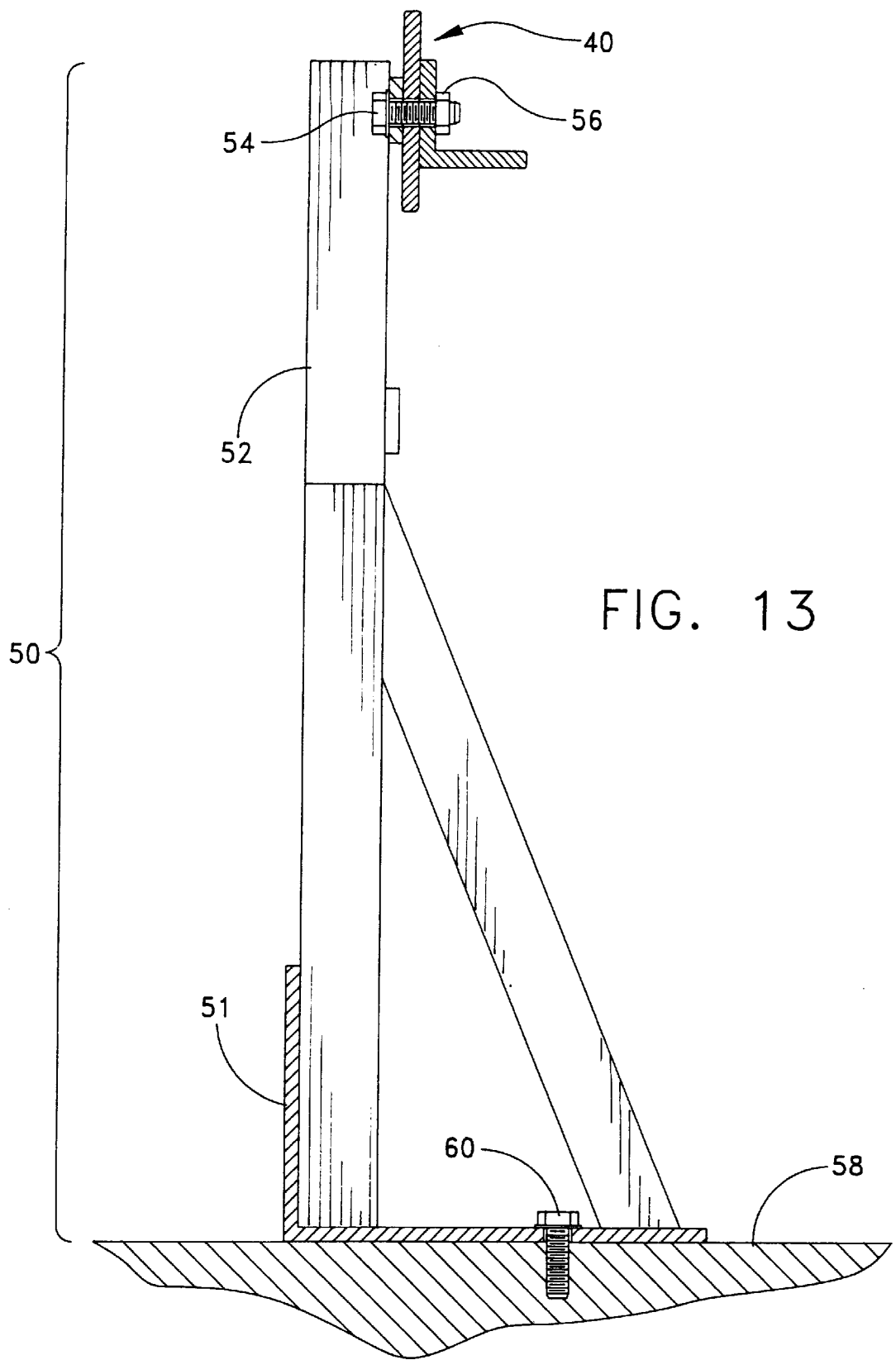
FIG. 13 is a side view of the transfer rail support of FIG. 12.
Figure 14:
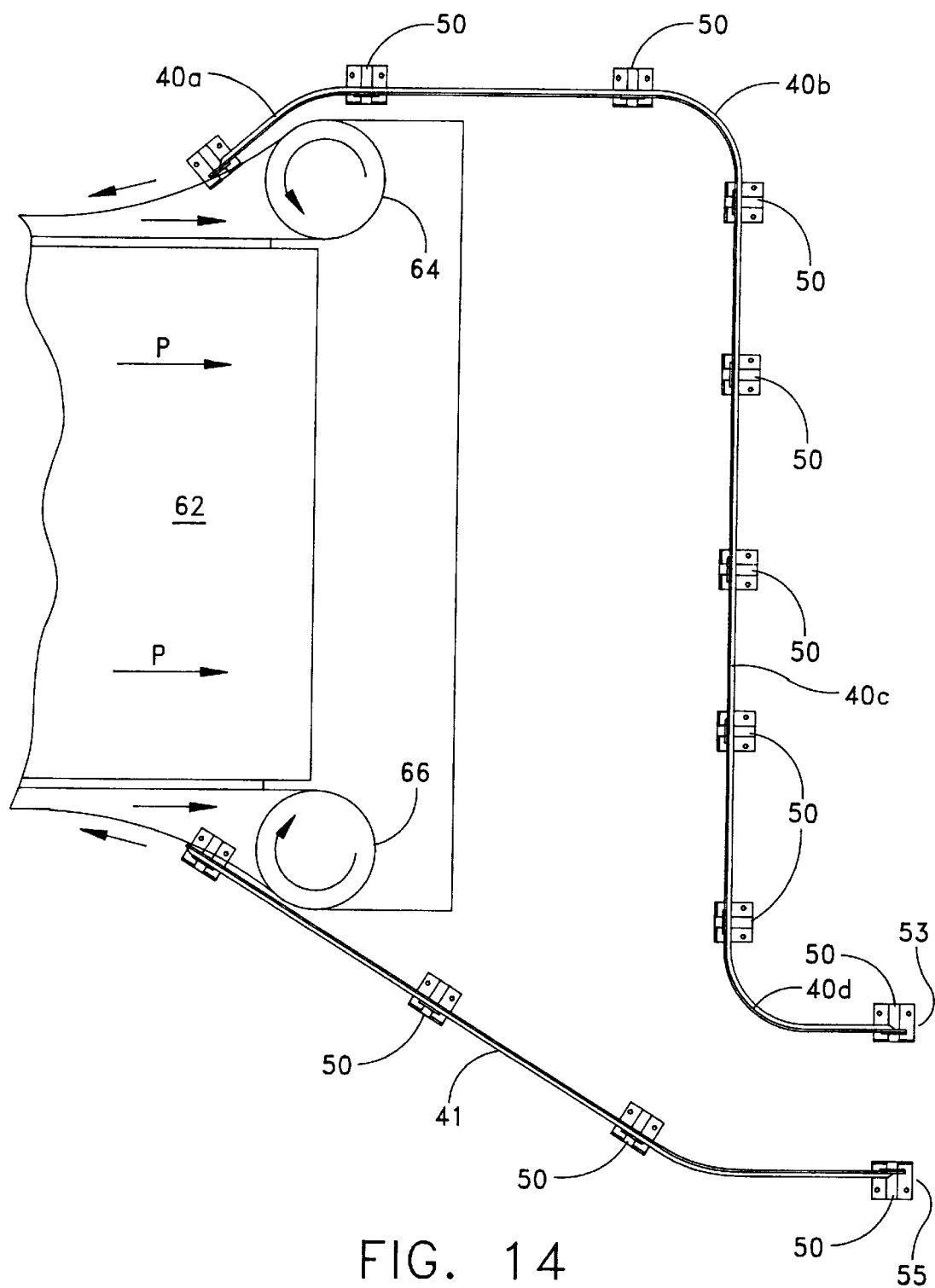
FIG. 14 is a plan view of the transfer rail layout in accordance with the present invention.

As shown in FIGS. 12 and 13, both the right side transfer rail assembly 40 and left side transfer rail assembly 41 are elevated above the ground and supported by a transfer rail support rail 50 which can be bolted directly to the ground by fastener 60. Transfer rail support 50 includes a base 51 and a vertical support 52 connected thereto. The apertures 42, shown in FIGS. 10 and 11, receive fasteners 54 and are secured in place by engagement with nut 56. As shown in FIG. 14, right side transfer rail 40 and left side transfer rail assembly 41 can be easily mounted proximal to plastics oven 62 in elevated fashion whereby the height at which the transfer rail assemblies 40 and 41 are elevated to are substantially the same as the height of chain in the oven during use. FIG. 14 further shows the installed rail assemblies 40 and 41 in a preferred configuration whereby the exit end 53 of the right transfer rail assembly 40 is close to the exit end 55 of the left side transfer rail assembly 41. The location of exit ends 53 and 55 being proximal to one another greatly facilitates the loading process in that carts do not need to be positioned on the opposing side of the oven.

It should be understood that two independent and separate closed loops of Tenter chain, 64 and 66 respectively, are present within oven 62. The right side loop of Tenter chain 64 will be unloaded onto a cart 10 of the present invention via right side transfer rail assembly 40 while left side loop of Tenter chain 66 will be unloaded and transported by cart 10 via left side transfer rail assembly 41. Both sides of closed loop of Tenter chain travel in the direction of the running plastic sheet indicated as P. Further, transfer rail supports 50 are located in spaced-apart relation throughout the respective lengths of rail assemblies 40 and 41. In accordance with the size of the oven and the application at hand, the number and location of transfer rail supports 50 can be varied and customized.

Figure 15:
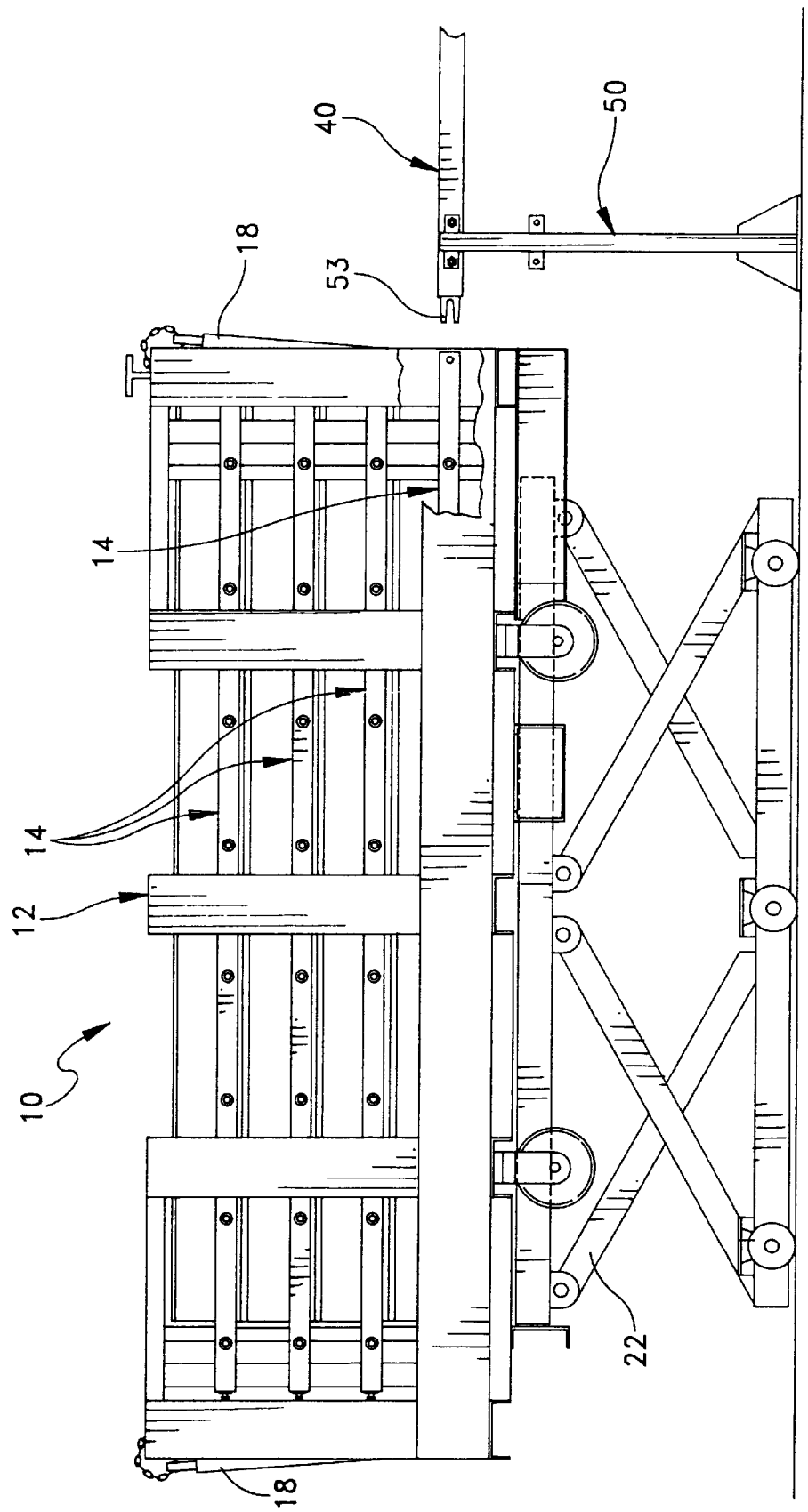
FIG. 15 is a front view of the cart in accordance with the present invention at the start of the chain segment loading process.
Figure 16:
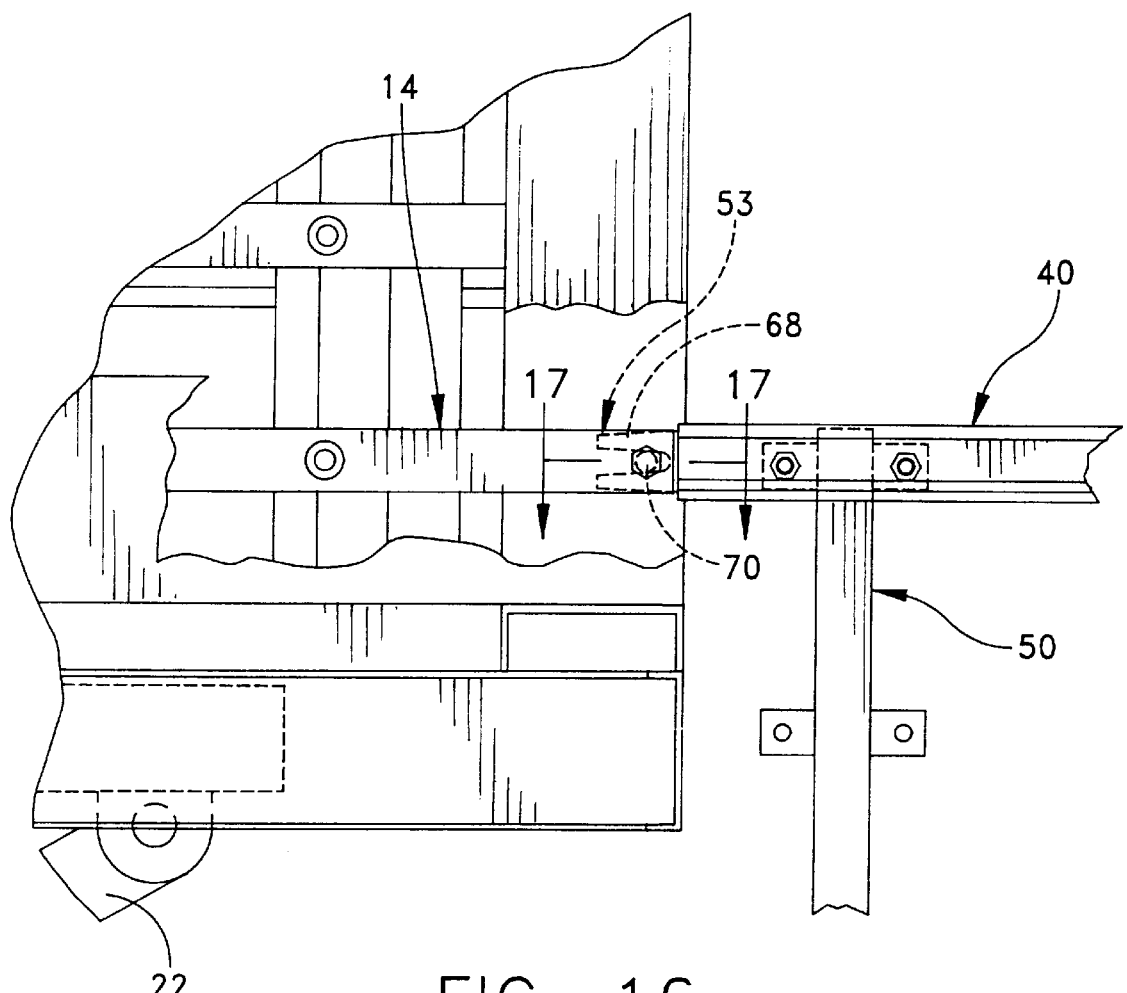
FIG. 16 is a close-up view of the transfer rail connection to the cart in accordance with the present invention.
Figure 17:
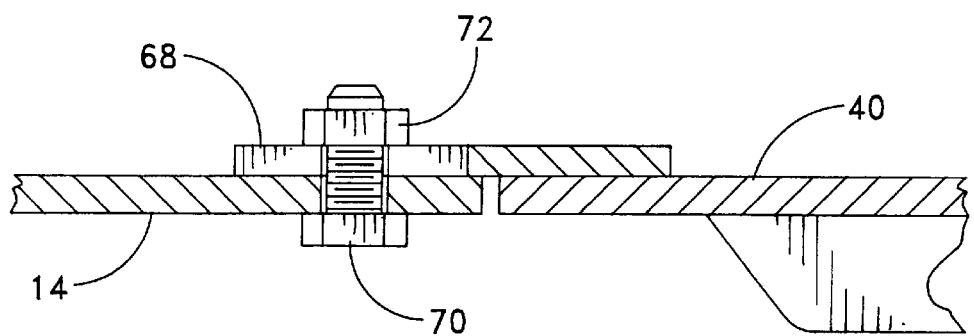
FIG. 17 is a top view of the connection of the transfer rail to the cart as shown in FIG. 16.

Referring now to FIGS. 15–22, the unloading operation, in accordance with the present invention, is shown. For illustration purposes only, the unloading of the right side loop of Tenter chain links, via transfer rail assembly 40, is shown. It should be understood that the same process is carried out to unload chain from the left side loop of Tenter chain lengths. In FIG. 15, cart 10 is rolled into close proximity to exit 53 of transfer rail assembly 40. Hydraulic lift table 22 is wheeled and centered under cart 10. Cart 10 is then elevated to an uppermost position whereby the lowermost track 14 is aligned horizontally with transfer rail assembly 40. As shown in FIGS. 16 and 17, lowermost track 14 is connected to free end 53 by engagement of fork 68 of transfer rail 40 to track 14 via securement of a fastener 70 and nut 72 configuration. This fastening will be retained in place during the loading of the lowermost track 14. It should be understood that tracks 14 are lowered in reverse order with the topmost track 14 being loaded last to avoid the cart from toppling over due to it being excessively top heavy.

Figure 18:
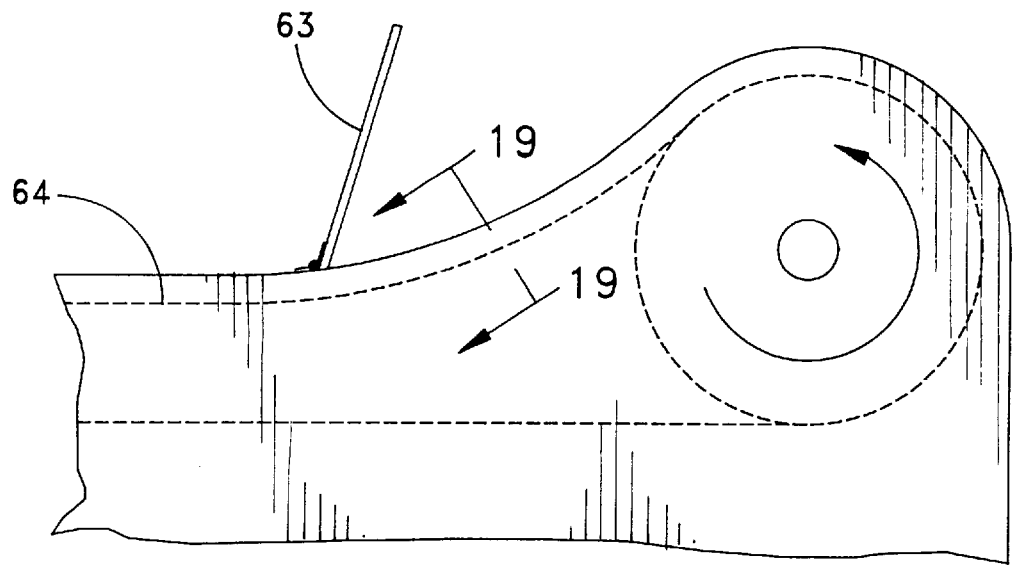
FIG. 18 is a general plan view of the right side Tenter chain loop in the oven.
Figure 19:
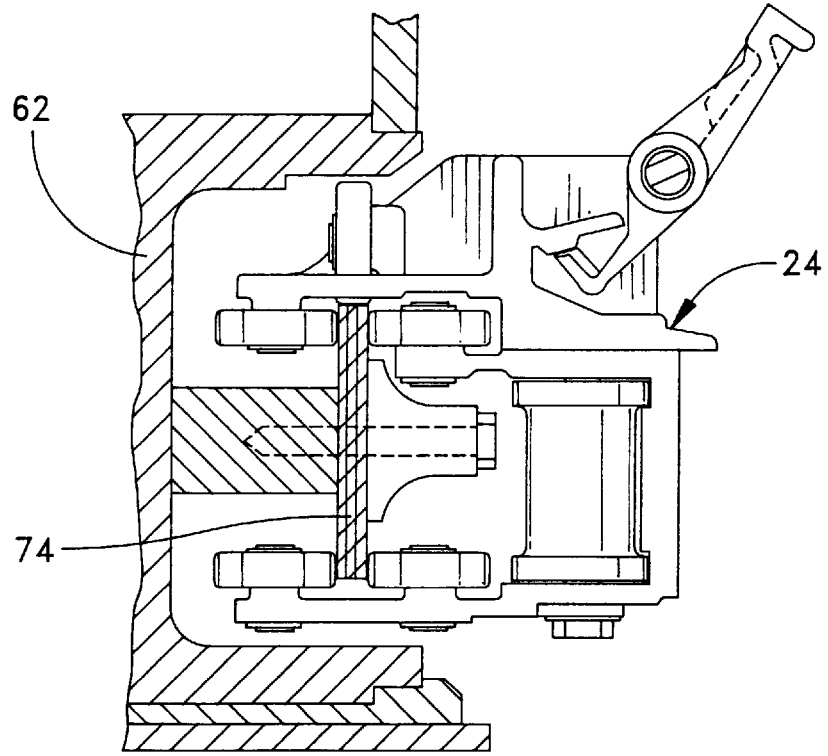
FIG. 19 is a cross-sectional view through the line 19—19 of FIG. 18.
Figure 20:
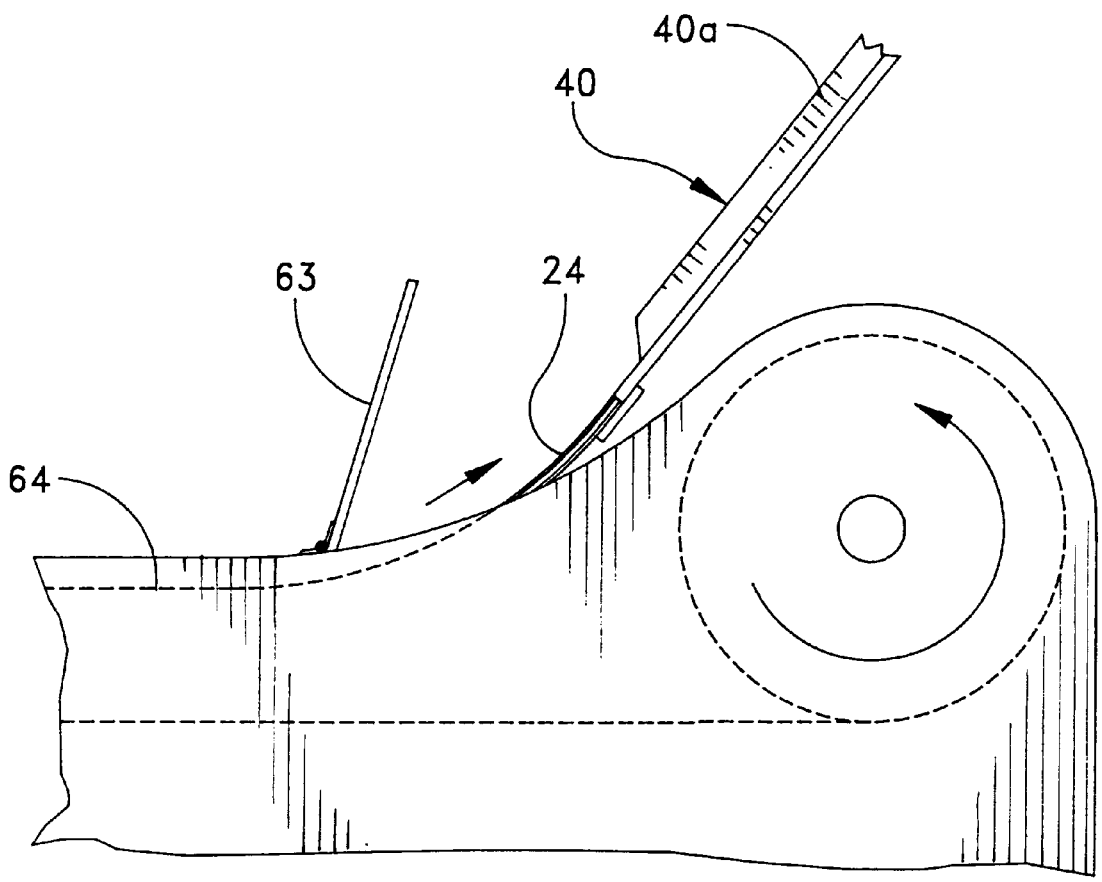
FIG. 20 is a top view of the right side chain loop being broken and routed to the right side transfer rail assembly.
Figure 21:
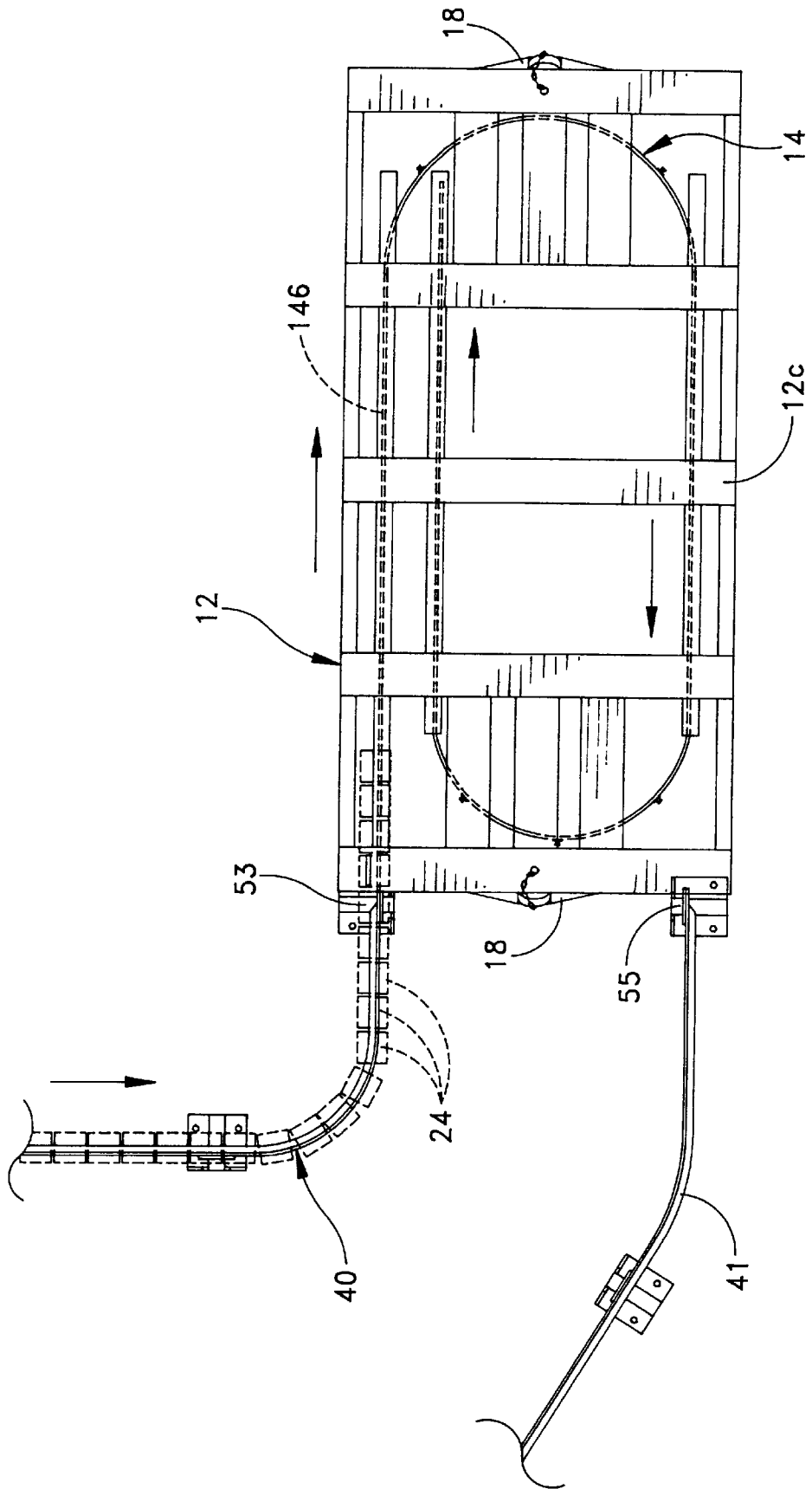
FIG. 21 illustrates the routing of a Tenter chain segment onto a track of the cart in accordance with the present invention.

In FIGS. 18 and 19, the breaking of the closed loop of Tenter chain 24, making up right side chain loop 64, is shown. Right side oven door 63 is opened to expose Tenter chain link 24 residing on an oven track 74. The Tenter chain loop 64 is broken and derailed from oven track 74 and routed onto right side transfer rail assembly 40, as best seen in FIG. 20. It should be understood that when the oven is stopped and chain is being unloaded, chain loop 64 may freely ride in any direction within the oven thus facilitating the loading onto transfer rail assembly 40 which is, in fact, a direction which is opposite to the travel of the chain during operation which is indicated by the curved arrow.

Figure 22:
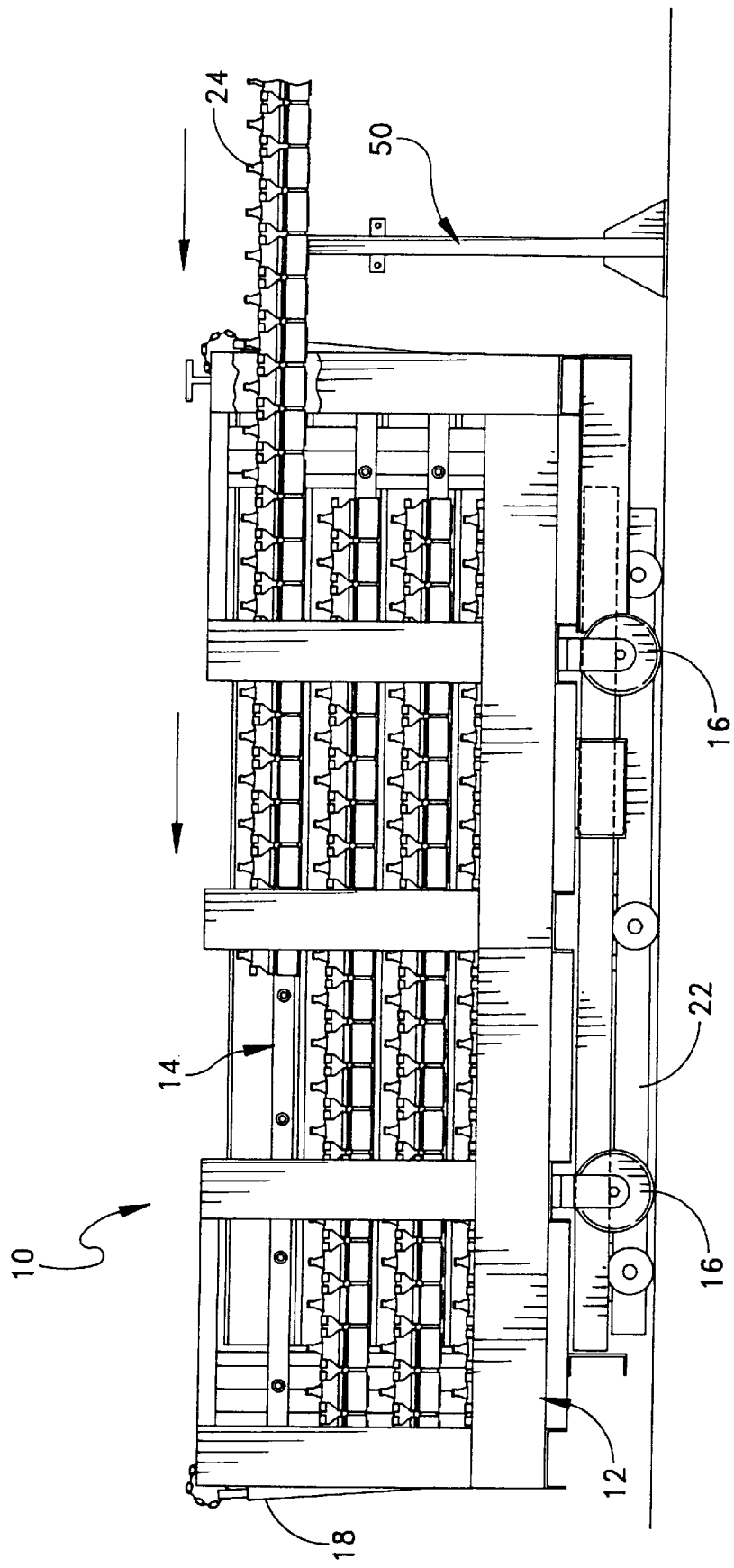
FIG. 22 is a front view of the last segment of Tenter chain being loaded onto the uppermost track of the cart in accordance with the present invention.

The chain is pulled from the oven and routed onto the right side transfer rail assembly 40 and once it reaches exit end 53, which is connected to a track 14 and cart 10, the segments of Tenter chain 24 glide easily onto track 14 and travel in the oval race track pattern until the entire track is filled. As stated above, it is preferred that a segment of 94 Tenter chain links 24 be accommodated on a given track level. Once the lowermost track 14 is filled with Tenter chain links 24, the hydraulic lift table 22 lowers the part one track level so that the track 14 which is second from the bottom is now aligned with transfer rail assembly 40. The second segment of links 24 are loaded to the second to lowest track. The same is accomplished for the third track. FIG. 22 illustrates the loading of the final, uppermost track 14 which receives the final segment of 94 Tenter chain links 24. As can be seen, cart 10 is now practically at the ground during receipt of the final and fourth segment of chain 24. As stated above, the reverse loading of Tenter chain prevents the unsafe top-heavy condition which could result in the cart toppling over.

Once all four tracks are completely filled with chain links, the full cart is transported easily to the repair and rebuild facility. Further, empty carts are similarly filled as needed to unload the entire length of Tenter chain. After the right side chain loop 64 has been completely unloaded, a set of mirror-image carts (not shown) are moved into proximity of exit end 55 of left side transfer rail assembly 41 which corresponds to left side closed loop 66. As stated above, a mirror-image cart is provided whereby first straight section 14b is, essentially, co-linear with left side transfer rail assembly 41 as opposed to right side transfer rail assembly 40. As a result, the appropriately configured (left side or right side) cart can be easily positioned proximal to the appropriate transfer rail assembly to receive and transport large segments at a time without the need for lifting or palletizing any of the Tenter chain links. As a result, the overall unloading and transporting process of four Tenter chain is significantly simplified and made more efficient. It should be understood that the re-loading process is the same as the unloading process but done in reverse.

It would be appreciated by those skilled in the art that various changes and modifications can be made to the illustrated embodiments without departing from the spirit of the present invention. All such modifications and changes are intended to be covered by the appended claims.

What is claimed is:

1. A cart for transporting segments of chain from an oven having a chain exit port, comprising:
    a frame;
    a plurality of wheels connected to said frame; said wheels facilitating movement of said frame;
    a plurality of tracks connected to said frame; said plurality of tracks being superimposed over and in spaced-apart relationship to one another; each of said plurality of tracks having a loading end and a length;
    a transfer rail, having a entry end and an exit end; said entry end of said transfer rail being positioned proximal to the chain exit port of the oven and said exit end being positioned proximal to said loading ends of said plurality of tracks;
    lift means connected to said frame for moving a loading end of one of said plurality of tracks in close proximity to said exit end of said transfer rail;
    rail transfer support means on said transfer rail for carrying a segment of chain from the oven to one of said plurality of tracks which has it loading end proximal to said exit end of said transfer rail; and
    track transport support means on each of said plurality of tracks for carrying a segment of chain during movement of said frame.

2. The cart of claim 1, wherein each of said plurality of tracks have a substantially oval configuration.

3. The cart of claim 1, wherein each of said plurality of tracks have a first straight section, a second straight section, a third straight section, a first curved section, and a second curved section; said first straight section is connected to said first curved section, said second straight section is connected to said first curved section at an end thereof not connected to said first straight section so as to be substantially parallel to said first straight section; said second curved section being connected to said second straight section at an end which is not connected to said first curved section, said third straight section being connected to said second curved section at an end not connected to said second straight section; said third straight section being substantially parallel to said first straight section and said second straight section; said third straight section being positioned between said first straight section and said second straight section; an end of said first straight section not connected to said first curved section providing said loading end.

4. The cart of claim 1, further comprising:
    a pull hook connected to said frame to facilitate movement of said frame.

5. The cart of claim 1, wherein a segment of chain includes a plurality of links; each of said links comprising mount means for receiving said track transfer support means.

6. The cart of claim 1, wherein each of said plurality of tracks receives and supports a segment of chain having at least 94 links.

7. The cart of claim 1, further comprising:
    centering means connected to said frame for positioning said frame relative to said lift means elevating means.

8. The cart of claim 7, wherein said lift means is a hydraulic lift removably positioned below said frame.

9. The cart of claim 8, wherein said centering means is positioned on the bottom surface of said frame and includes an angled groove with an open receiving end proximal to an edge of said frame tapering inwardly to an approximate width of said hydraulic lift as said groove extends away from said edge, said approximate width of said hydraulic lift extending to form a channel with parallel side walls of a an approximate width of said hydraulic lift; said channel housing said hydraulic lift during operation of said hydraulic lift.

10. The cart of claim 1, further comprising:
    at least one mount member connected to said transfer rail and the ground; said transfer rail being elevated from said ground.

11. The cart of claim 1, wherein said frame, said plurality of tracks and said transfer rail are manufactured of steel.

12. The cart of claim 1, wherein said plurality of tracks is four.

13. The cart of claim 1, wherein said plurality of tracks slideably receive said segments of chain.

14. A method of transporting segments of chain from an oven, comprising the steps of:
    providing a loop of chain, having individual links, in said oven;
    mounting a transfer rail, having an entry end and an exit end, to the ground proximal to a chain exit port of the oven;
    placing said entry end of said transfer rail proximal to said chain exit port;
    providing a frame;
    providing a plurality of wheels connected to said frame; said wheels facilitating movement of said frame proximal to said transfer rail;
    providing a plurality of tracks connected to said frame; said plurality of tracks being superimposed over and in spaced-apart relationship to one another; each of said plurality of tracks having a loading end and a length;
    connecting said exit end of said transfer rail to said loading end of one of said plurality of tracks;
    breaking said loop of chain;
    routing a chain segment of a predetermined number of said links of said chain onto one of said plurality of tracks via said transfer rail;
    breaking said chain segment from said loop of chain;

disconnecting said exit end of said transfer rail from said loading end of said one of said plurality of tracks; and rolling said frame, carrying said chain segment, away from said oven.

15. The method of claim 14, further comprising the steps of:

connecting said exit end of said transfer rail to a loading end of one of said plurality of tracks not carrying a chain segment;

routing a second chain segment of a predetermined number of said links onto said one of said plurality of tracks not carrying a chain segment;

breaking said second chain segment from said loop of chain; and disconnecting said exit end of said transfer rail from said loading end of said one of said plurality of tracks carrying said second chain segment.

16. The method of claim 14, further comprising the step of:

elevating said frame to facilitate connection of said transfer rail to said plurality of tracks.

17. The method of claim 14, further comprising the step of:

providing said plurality of tracks in a substantially oval configuration.

18. A cart for unloading a segment of chain from an oven, comprising:

a track means for supporting said segment of chain; said track means including a free end means for receiving said segment of chain;

wheel means connected to said track means for moving said track means proximal to said oven; and transfer rail means positioned between the oven and said track means for routing said segment of chain from said oven to said track means via said free end means.

* * * * *